(12) United States Patent
Krause et al.

(10) Patent No.: US 7,880,668 B1
(45) Date of Patent: Feb. 1, 2011

(54) AUTOMATED RADAR ELEVATION ANGLE CONFIGURATION

(75) Inventors: Stefan M. Krause, Cherry Hill, NJ (US); Eric D. Toal, Middletown, NJ (US); Louis Lagonik, Voorhees, NJ (US)

(73) Assignee: Lockheed Martin Corproation, Bethesda, MD (US)

( * ) Notice: Subject to any disclaimer, the term of this patent is extended or adjusted under 35 U.S.C. 154(b) by 238 days.

(21) Appl. No.: 12/330,238

(22) Filed: Dec. 8, 2008

(51) Int. Cl.
*G01S 13/00* (2006.01)
(52) U.S. Cl. .......................... 342/75; 342/136; 342/147
(58) Field of Classification Search .................. 342/25, 342/63–65, 73–103, 118, 136, 139, 147–158
See application file for complete search history.

(56) References Cited

U.S. PATENT DOCUMENTS

| | | | |
|---|---|---|---|
| 5,138,323 A | 8/1992 | Taylor, Jr. | |
| 5,311,188 A | 5/1994 | Meijer et al. | |
| 6,233,522 B1 * | 5/2001 | Morici | 701/208 |
| 6,236,351 B1 * | 5/2001 | Conner et al. | 342/26 B |
| 6,563,452 B1 * | 5/2003 | Zheng et al. | 342/26 R |
| 6,771,207 B1 | 8/2004 | Lang | |

\* cited by examiner

*Primary Examiner*—Thomas H Tarcza
*Assistant Examiner*—Timothy A Brainard
(74) *Attorney, Agent, or Firm*—Duane Morris LLP

(57) ABSTRACT

According to an embodiment of the disclosure, a computer implemented method of configuring a land-based radar system for scanning a scan region is disclosed. The method comprises dividing the scan region into a grid of blocks and obtaining a terrain elevation data for the scan region. For an elevation angle for the radar system, determining those blocks in the grid that are visible to the radar system and those blocks that are not visible to the radar based on the terrain elevation data. Then, step of determining the visible blocks is repeated for all elevation angles in a predefined set of elevation angles for the radar system. Next, an optimal scan elevation angle for the radar system is determined as the scan elevation angle which resulted in the maximum number of visible blocks in the scan region and the radar system is set to the optimal scan elevation angle.

6 Claims, 5 Drawing Sheets

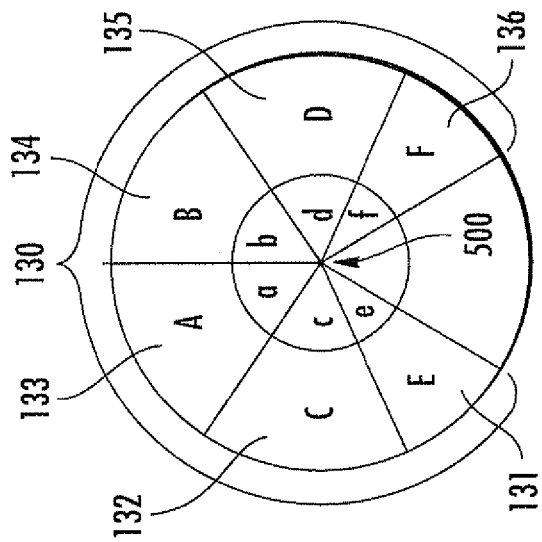
FIG. 4C  300° CONFIGURATION
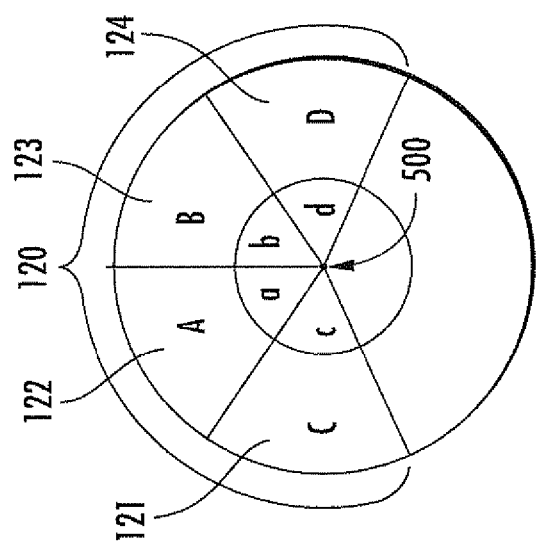
FIG. 4B  200° CONFIGURATION
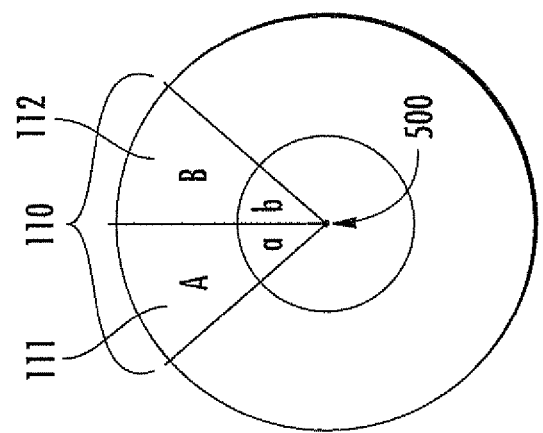
FIG. 4A  100° CONFIGURATION

AUTOMATED RADAR ELEVATION ANGLE CONFIGURATION

CROSS-REFERENCE TO RELATED APPLICATION

None

FIELD OF THE INVENTION

This disclosure relates to radar systems and in particular to automatic configuration of radar elevation angle.

BACKGROUND

A radar system operates by transmitting electromagnetic signals and receiving these signals after they have been reflected from targets. However, besides the reflections from the wanted targets, such as an aircraft, reflections from other unwanted objects occur. These unwanted objects are referred to as clutter and generally include terrain features such as hills, cliffs and man made objects such as buildings. Because the structures making up the clutter have varying heights, for a given clutter field in front of a radar system, one can minimize the blinded areas in the radar's scan area by adjusting the elevation angle of the radar. Since the radar can not detect targets of interest that are in the blinded area, minimizing the blinded area maximizes the effectiveness of the radar system.

Setting a radar system's elevation angle accurately requires both training and experience. The most accurate way to set the elevation angle is to use a clutter map (a map showing the bird's eye view of what the radar can and can not see in the scan area) generated by the radar processor software and manually set the elevation angle that will provide maximum coverage in the scan region. When using a third party application software to control the radar, however, it is often not possible to allocate sufficient bandwidth necessary to pass the clutter map data to the radar operator and it is not possible or difficult for the operator to set the radar system to the optimum elevation.

SUMMARY

According to an embodiment of the disclosure, a computer implemented method of configuring a land-based radar system for scanning a scan region is disclosed. The method comprises dividing the scan region into a grid of blocks and obtaining a terrain elevation data for the scan region. For an elevation angle for the radar system, determining those blocks in the grid that are visible to the radar system and those blocks that are not visible to the radar based on the terrain elevation data. The step of determining the visible blocks is repeated for all elevation angles in a predefined set of elevation angles for the radar system. Next, an optimal elevation angle for the radar system is determined as the elevation angle which resulted in the maximum number of visible blocks in the scan region and the radar system is set to the optimal elevation angle.

The result can be used to generate a clutter map of the scan region for the optimal elevation in which the blocks visible to the radar system are identified. The clutter map can be presented to the radar operator by overlaying the clutter map on the radar system's display to show what the radar can and cannot see.

According to another embodiment, the scan region can be defined into one or more sectors and an optimal elevation angle for the radar system is determined for each sector by determining the elevation angle that resulted in the maximum number visible blocks in each sector. The radar system is then configured to use the optimal elevation angle corresponding to a particular sector that a radar operator selects.

The method described herein provides an automated means of setting radar elevation for one or more sectors at the push of a button. This would allow for users with no experience or expertise using radar to be able to configure the system. Additionally, the algorithm divides a selected scan area into multiple adjacent sectors and sets the optimal elevation angle for each sector to account for varying terrain.

BRIEF DESCRIPTION OF THE DRAWINGS

These and other features and advantages of the present invention will be more fully disclosed in the following detailed description of the preferred embodiment of the invention, which is to be considered together with the accompanying drawings wherein like numbers refer to like parts, and further wherein:

FIGS. 4A-4C are illustrations of three exemplary radar scan configurations in which the method of the present disclosure can be implemented.

DETAILED DESCRIPTION

Figure 1:
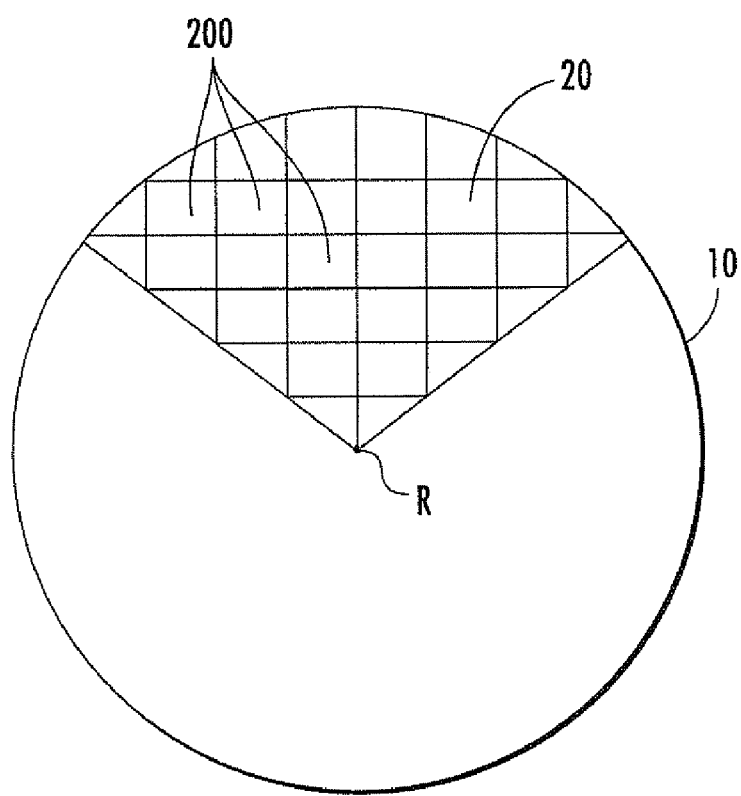
FIG. 1 is a schematic bird's eye view illustration of the radar system's scan region defined into a grid.

This description of the preferred embodiments is intended to be read in connection with the accompanying drawings, which are to be considered part of the entire written description of this invention. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation.

Referring to FIG. 1, an embodiment of the method of this disclosure will be described. FIG. 1 is a bird's eye schematic illustration of a radar system R and a circle 10 representing the radar system's potential scan region. The radar system R is at the center of the circle 10 and the radius of the circle 10 represents the maximum range of the radar system R. The region 20 represents an arbitrarily defined desired scan region for the radar system R for the purposes of this discussion. In order to generate a clutter map for the radar system R, the scan region 20 is defined into a grid of blocks as shown. In one embodiment, each block 200 in the grid has a dimension of 30 m×30 m.

Figure 2:
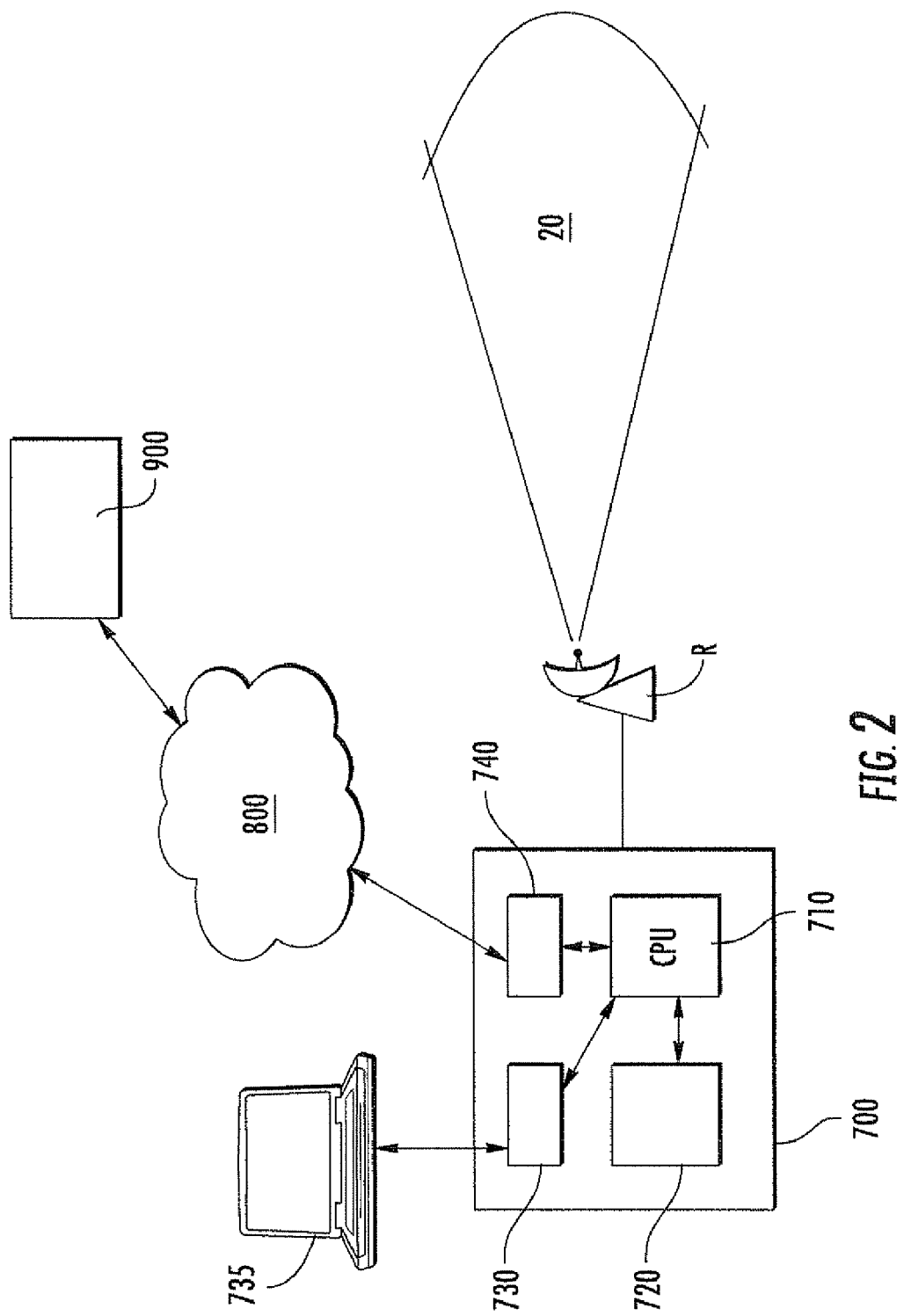
FIG. 2 is a schematic block diagram of a radar system according to an embodiment.

Referring to FIG. 2, according to an embodiment, the radar system R comprises a computer 700 configured and adapted to control the operation of the radar system R. The computer 700 can comprise a central processor 710, a data storage device 720 for storing information and executable programs, a user interface 730 that allows the computer 700 to interface with a user interface device 735 such as a keyboard, display, etc. The computer 700 also comprises a communications interface 740 for enabling the computer 700 to link to a communications network 800, such as an Internet or other suitable and appropriate networks. The communications interface 740 can enable wireless or wired communications link to the communications network 800. The computer 700 obtains a terrain elevation data for the scan region 20 which also includes the elevation data for the radar system's location.

In one embodiment, the computer 700 acquires the terrain elevation data for the scan region 20 from a data source 900 via the communications network 800 or from data locally stored in a data storage device 720. One example of such a data source 900 is the software service such as a Geographic Information System (GIS) service that can return elevation data in a latitude/longitude grid for a requested region.

In another embodiment, one can acquire the terrain elevation data on a portable data storage media such as a flash memory device, magnetic or optical disk, etc. and then load it on to the computer 700. However, for a mobile radar system that need to be on the move often, automatic acquisition of the terrain elevation data by the computer 700 through a communications network 800 would be more useful.

Once the radar system's computer 700 obtains the terrain elevation data, the radar system has information on the location of the radar (latitude and longitude), the elevation of the radar system's location (which includes both the elevation from the terrain data plus the mounting height of the radar if it is on a tower or mast) and the terrain elevations of each of the blocks 200 in the scan region 20. With this information, for a given radar elevation angle, the radar system R can determine which of the blocks are visible and which ones are not visible to the radar system R. The radar system then repeats the calculation for another radar elevation angle until a complete set of predefined radar elevation angles are checked. The radar system keeps track of the number of visible blocks for each radar elevation angle and at the end of the process, selects the radar elevation angle that provided the maximum number of visible blocks in the scan region 20 as the optimal elevation angle for the radar system R at that location.

Figure 3:
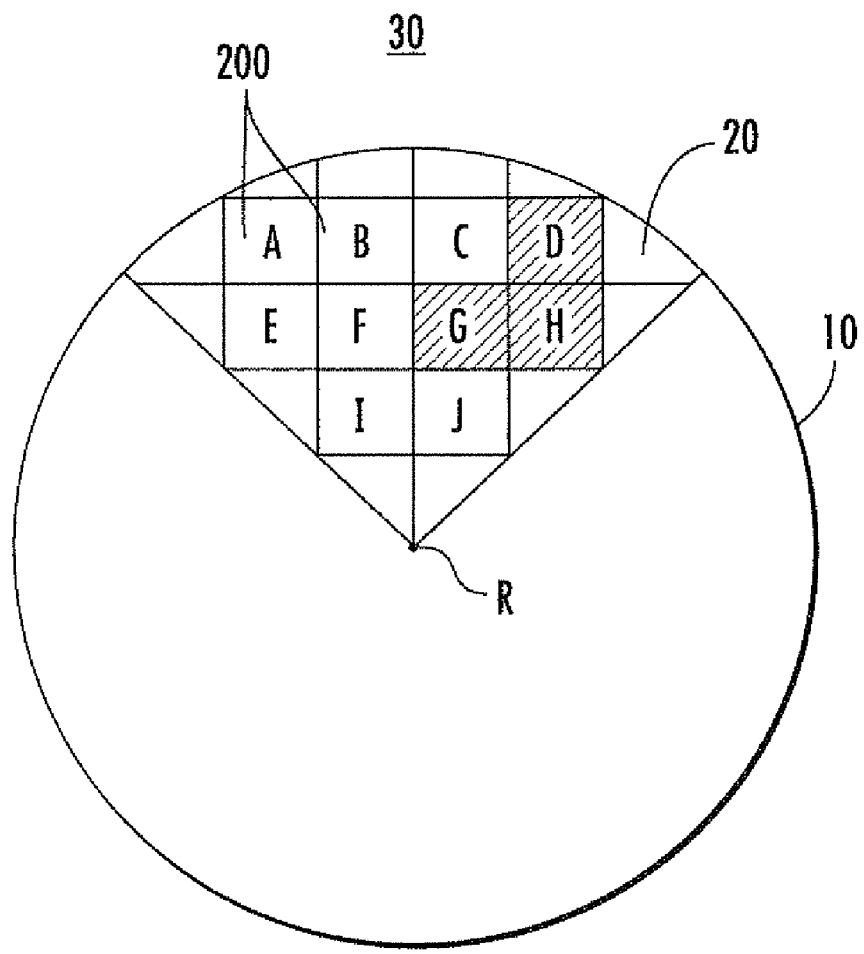
FIG. 3 is a schematic bird's eye view illustration of a clutter map.

Next, the radar system's computer can generate a clutter map of the scan region 20, to be displayed on a user interface device 735, for the determined optimal elevation angle by identifying the blocks that are visible in the scan region 20. FIG. 3 is an illustration of an example of such a clutter map 30 for the scan region 20. The blocks in the scan region 20 are labeled as A, B, C, . . . , J. In this example, the blocks A, B, C, E, F, I and J are visible blocks and the blocks D, G and H are non-visible or blind blocks. In the exemplary clutter map, the blind blocks D, G and H are shaded to distinguish them from the visible blocks. The clutter map 30 can be overlaid on the radar system's display and the radar operator can readily tell where the blind areas are in the scan region 20.

FIGS. 4A-4C are schematic illustrations of some examples of radar scan configurations. In each radar scan configuration, a radar's scan region may be defined into a plurality of sectors. The optimal radar scan elevation angle can be automatically determined for each of the plurality of sectors by the radar system's radar configuration software by implementing the method described above for each sector. FIG. 4A shows a scan sector configuration for a radar scan region 110 that is 100° wide. FIG. 4B shows a scan sector configuration for a radar scan region 120 that is 200° wide. FIG. 4C shows a scan sector configuration for a radar scan region 130 that is 300° wide. Each scan region can be centered along the bearing that the front of the radar is facing as shown in the figures. Each of the scan region can be divided into 50° wide sectors to allow the radar system's elevation angle to be set for each sector to account for varying terrain within the scan region. The actual width of the sectors may vary and 50° is an example. Additionally, each sector can be subdivided into a short-range sector and a long-range sector. In one example, short-range sectors can go from 100 m to 2500 m and long-range sectors can go from 2200 m to 6000 m.

For example, in FIG. 4A the 100° wide scan region 110 is divided into two 50° sectors 111 and 112. The sectors 111 and 112 are further divided into short-range sectors a and b and long-range sectors A and B, respectively. In FIG. 4B, the 200° wide scan region 120 is divided into four 50° sectors 121, 122, 123 and 124. Each of the sectors 121, 122, 123 and 124 are further divided into short range sectors a, b, c and d and long range sectors A, B, C and D, respectively. In the example shown in FIG. 4C, the 300° wide scan region 130 is divided into six 50° sectors 131, 132, 133, 134, 135 and 136. Each of the sectors 131, 132, 133, 135 and 136 are further divided into short range sectors a, b, c, d, e and f and long range sectors A, B, C, D, E and F, respectively. For each of the sectors in the various configurations, the start and stop azimuth and range defines the location of the particular sector in relation to the radar system located at the location 500. The start and stop azimuth and range values associated with each sector are stored in the radar system's control system so that they can be accessed by the radar elevation configuration algorithm running on the radar system's control system as the radar scans the regions under surveillance.

After a radar operator selects one of the radar scan configurations, the operator can automatically configure the radar system to have optimal radar elevation angles for each of the sectors in the selected radar scan configuration by initiating the radar elevation configuration algorithm of the present disclosure. The radar scan configuration algorithm uses the necessary information such as the number of sectors in the scan area as well as the start and stop azimuth and range for each sector in the selected scan area and determines the optimal radar elevation angle for each sector according to the method described above. In other words, the radar scan configuration algorithm uses the method described above to generate clutter maps for a plurality of scan elevation angles in each of the sectors and selects the scan elevation angle that results in a clutter map with the most number of visible blocks as the optimal scan elevation angle.

The radar configuration software will then use the optimal radar elevation angle, the clutter map, start and stop azimuth, start and stop ranges for each sector, etc. to configure the radar. Once the radar is configured, for any given sector(s) in the scan region selected by the operator to be scanned, the radar system will be configured for optimal scanning configuration for the selected sector(s). As the radar scans the selected scan region, the start and stop azimuth and start and stop ranges tell the radar system to select the appropriate scan elevation angle.

[Example of a Graphical User Interface (GUI) for the Radar System]

Figure 5:
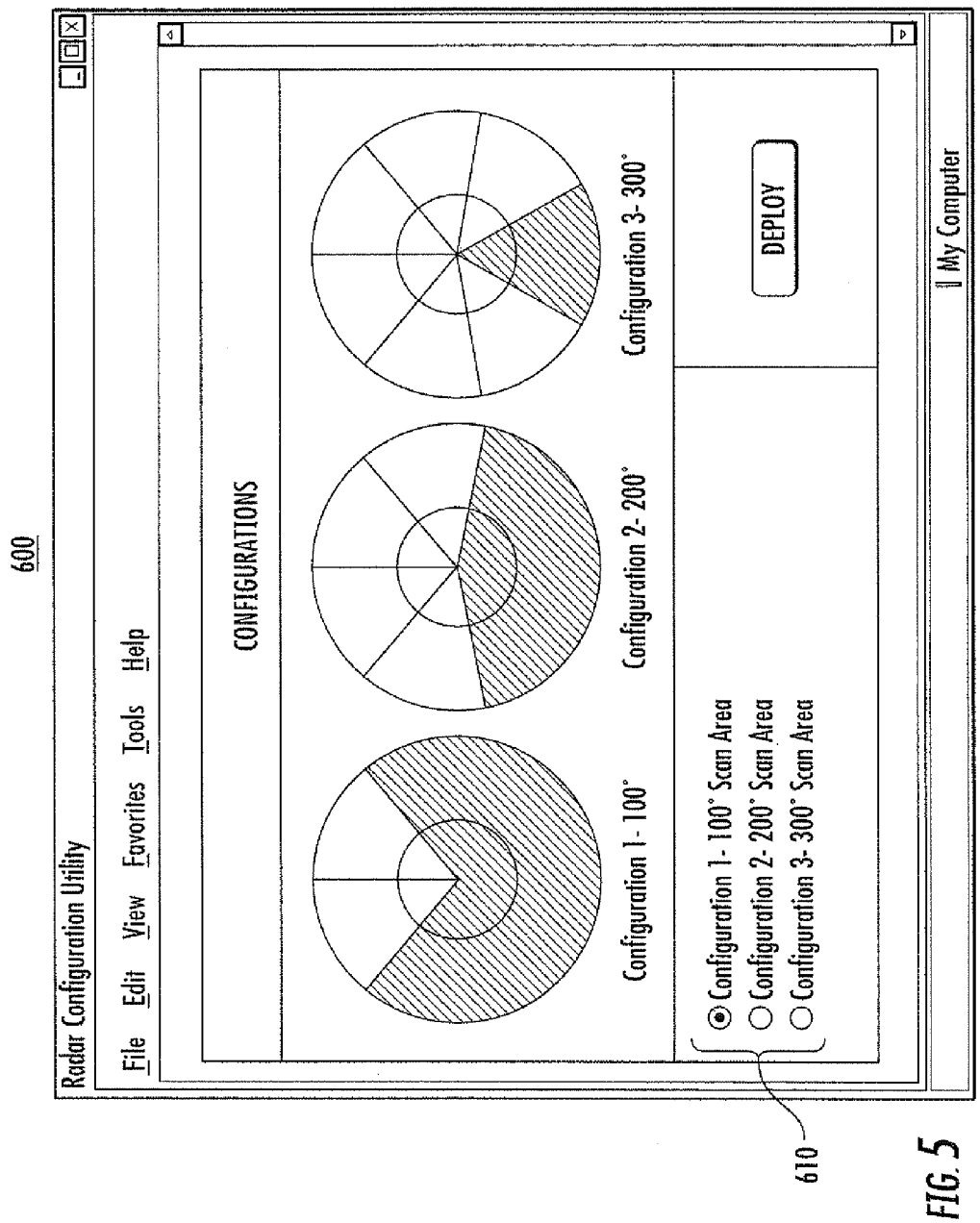
FIG. 5 is an illustration of an example of a Graphical User Interface (GUI) for a radar system.

FIG. 5 shows an example of a GUI 600 for a radar configuration software that implements the radar configuration software. The GUI 600 can be used to allow the radar operator to choose between the three scan area configurations 1, 2 or 3. The GUI 600 can consist of graphics that illustrate each of the three configuration options: 100°, 200° and 300°. The GUI can include buttons 610 allowing the user to select one of the available scan configuration options. The GUI can also have a "Deploy" button, for example, to initiate the radar elevation configuration algorithm and ultimately configure the radar system automatically.

In one example of a radar system implementing the method described herein, the radar configuration software and the radar elevation configuration algorithm components may utilize the following inputs and outputs:

| The Radar Configuration Utility GUI Inputs | |
| --- | --- |
| Requests | Source |
| Configuration Number | User |

| Outputs | |
| --- | --- |
| Published Information | Destination |
| Number of Sectors | The Radar Elevation Algorithm |
| Start Azimuths | The Radar Elevation Algorithm |
| Stop Azimuths | The Radar Elevation Algorithm |
| Start Ranges | The Radar Elevation Algorithm |
| Stop Ranges | The Radar Elevation Algorithm |

| The Radar Elevation Algorithm Inputs | |
| --- | --- |
| Requests | Source |
| Number of Sectors | The Radar Configuration Utility GUI |
| Start Azimuths | The Radar Configuration Utility GUI |
| Stop Azimuths | The Radar Configuration Utility GUI |
| Start Ranges | The Radar Configuration Utility GUI |
| Stop Ranges | The Radar Configuration Utility GUI |
| Elevation Angle | GIS Service |
| Obstructed | GIS Service |

| Outputs | |
| --- | --- |
| Published Information | Destination |
| Azimuth | GIS Service |
| Range | GIS Service |
| Clutter Map | InfoScene |
| Clutter Map Reference | InfoScene |
| Number of Sectors | InfoScene |
| Start Azimuths | InfoScene |
| Stop Azimuths | InfoScene |
| Start Ranges | InfoScene |
| Stop Ranges | InfoScene |
| Elevation Angles | InfoScene |

GIS Service is a software service providing query/response functionality to obtain geographic data related to the terrain and the location of the radar. InfoScene in an example of a display application used for visually rendering radar and clutter map data.

[Example of a Radar Elevation Configuration Algorithm]

The radar elevation configuration algorithm receives the number of sectors as well as the start and stop azimuth and range for each sector through the radar configuration software's GUI. The radar elevation configuration algorithm then finds the optimal elevation angle for each sector in the scan area by processing one sector at a time.

In this example, the scan sector is defined as the full 360° scan area around the radar system having a start range of 100 m and stop range of 6000 m. The radar elevation configuration algorithm generates a clutter map which divides the 360°, 100 m to 6000 m area into 30 m×30 m blocks. This results in 126067 blocks in the sector. The clutter map is then divided into 197 (5900 m/30 m) range blocks (Range Block=0 to 196). The block boundaries can be calculated as:

$$\text{Start Range} = 100 + (30 \times \text{Range Block})$$

$$\text{Stop Range} = \text{Start Range}(\text{Range Block}+1) - 1$$

$$\text{Azimuth Span Per Block} = \text{ROUND}(6400/((2 \times PI \times \text{Start Range})/30))$$

$$\text{Number of Azimuth Blocks} = \text{ROUND}(6400/\text{Azimuth Span Per Block})$$

$$\text{Azimuth Block} = (0 \text{ to Number of Azimuth Blocks} - 1)$$

$$\text{Start Azimuth} = \text{Azimuth Span Per Block} \times \text{Azimuth Block}$$

$$\text{Stop Azimuth} = \text{Start Azimuth}(\text{Azimuth Block}+1) - 1$$

The Stop Range of the last Range Block is 6000 m. The Stop Range of the last Azimuth Block at each range is 6399 mils. Start and Stop Range are in meters. Start Width and Azimuth Span Per Block are in mils. The area of every block is approximately 900 m$^2$ (30 m×30 m). All azimuth values must be calculated separately for each range block. The clutter map is a 197×1280×5 array. The five attributes of the array are:

Obstructed—This states if that block in the array is line-of-sight obstructed from the radar by another block in the array Start Range—Start range of each block Stop Range—Stop range of each block Start Azimuth—Start azimuth of each block Stop Azimuth—Stop azimuth of each block The Obstructed attribute for every block is initially set to Obstructed. The radar elevation configuration algorithm then sets all visible blocks in each sector to Visible. The clutter map can be referenced by (Range Block, Azimuth Block). Another 197×2 array called Clutter Map Reference can be created. The Clutter Map Reference array can have 197 blocks, one for each range block. The value of each block in the array can be set to the number of azimuth blocks at that range.

The radar elevation configuration algorithm can build an N×6 array of all N blocks in the sector it is currently processing. Each block in the array can have four attributes:

Range Block—Range Clutter Map reference value

Azimuth Block—Azimuth Clutter Map reference value

Range—Range at which that block in the array is located

Azimuth—Azimuth at which that block in the array is located

Elevation Angle—This is the angle, plus or minus from horizontal, that the radar would need to look at to draw a direct line-of-sight to that block in the array.

Obstructed—This states if that block in the array is line-of-sight obstructed from the radar by another block in the array The radar elevation configuration algorithm can populate the clutter map of the scan area by querying the GIS (Geographic Information Systems) Service. The radar elevation configuration algorithm sends the Azimuth and Range for each block to the GIS Service. The GIS Service returns Elevation Angle and Obstructed information. The Azimuth and Range passed to the GIS Service for each block is the center point of the block, defined as:

$$\text{Range} = \text{Start Range} + 15$$

$$\text{Azimuth} = \text{Start Azimuth} + \text{ROUND}(\text{Azimuth Span Per Block}/2)$$

The blocks which are in the sector being processed are the blocks that have a range between the sector Start and Stop Range AND the blocks that have a range between the sector Start and Stop Azimuth.

If the sector is a long range sector (2200 m to 6000 m) the radar elevation configuration algorithm can look at the blocks located at 2200 m and find the block with the lowest elevation angle. The radar elevation configuration algorithm will then look at the blocks located at 6000 m and find the block with the highest elevation angle. This angle–26 mils will be stored as the Stop Angle. If the sector is a short range sector (100 m to 2500 m) the radar elevation configuration algorithm will look at the blocks located at 100 m and find the block with the lowest elevation angle. This angle+26 mils will be stored as the Stop Angle. The radar generally moves in increments of 6 mils so the Start and Stop Angle will be rounded to the nearest value divisible by 6. The number of steps needed will be determined by determining the difference between the Start and Stop Angle and dividing it by 6.

The radar elevation configuration algorithm creates an S×2 array, where S is the number of steps. Each array block will have two attributes:

Elevation Angle—This is the angle used to calculate the area the radar can see.

Blocks—The number of non-obstructed blocks the radar can see when looking at the corresponding elevation angle.

The algorithm will filter the array to determine which non-obstructed blocks have an elevation angle that falls within the range of the Start Angle+/−26 mils. This determines which blocks the radar can see within the sector using its 3° (53 mil) elevation beam width. The algorithm will store the angle as the Elevation Angle. The algorithm then stores the total number of non-obstructed blocks the radar can see at that elevation angle. The new angle will be set to the Start Angle+6 mils and the process will be repeated until the Stop Angle is reached and processed. The final S×2 array will contain Elevation Angles and how many non-obstructed blocks can be seen when looking at each angle. The optimal Elevation Angle will be determined by the angle which allows for the most non-obstructed blocks to be seen.

Once an optimal Elevation Angle is determined for a sector, all visible blocks in the grid should have their label set to visible in the clutter map. After all sectors are processed, the clutter map shows which blocks are visible in the scan area and can be overlaid on the radar display.

After the radar elevation configuration algorithm determines the optimal elevation angle for each sector, the algorithm passes the clutter map, the clutter map reference, start and stop azimuths, start and stop ranges and optimal elevation angle for each sector as well as the total number of sectors to the radar configuration software to configure the radar system.

[Example of Computer Software Steps]

1. Input
   a. Get input from the Radar Configuration Utility GUI
      i. Number of Sectors
      ii. Start Azimuths
      iii. Stop Azimuths
      iv. Start Ranges
      v. Stop Ranges
2. Calculate Clutter Map
   a. Range Block = (0 to 196)
   b. Start Range = 100 + (30 × Range Block)
   c. Stop Range = Start Range(Range Block + 1) − 1
   d. Stop Range(196) = 6000 m
   e. Azimuth Span Per Block = ROUND(6400/ ((2 × PI × Start Range)/30))
   f. Number of Azimuth Blocks = ROUND(6400/ Azimuth Span Per Block)
   g. Azimuth Block = (0 to Number of Azimuth Blocks − 1)
   h. Start Azimuth = Azimuth Span Per Block × Azimuth Block
   i. Stop Azimuth = Start Azimuth(Azimuth Block + 1) − 1
   j. Stop Azimuth(Azimuth Block(Max)) = 6399 mils
3. Create Clutter Map Reference array 197 × 1
   a. Number of Azimuth Blocks in each Range Block
4. Clutter Map = Grid of the 360°, 100 m to 6000 m space = 197 × 1280 × 5 array
   a. Obstructed – Initially set to Obstructed for all blocks
   b. Start Range
   c. Stop Range
   d. Start Azimuth
   e. Stop Azimuth
5. For i = 1 to i = Number of Sectors
   a. Blocks passed to GIS Service by center of block location
      i. Range = Start Range + 15
      ii. Azimuth = Start Azimuth + ROUND (Azimuth Span Per Block/s)
   b. Block in a sector shall be blocks which meet both of the following conditions:
      i. Start Range ≦ Range ≦ Stop Range
      ii. Start Azimuth ≦ Azimuth ≦ Stop Azimuth
   c. Creat an N × 6 array of all N blocks in the sector, using the attributes:
      i. Range Block
      ii. Azimuth Block
      iii. Range
      iv. Azimuth
      v. Elevation Angle
      vi. Obstructed
   d. Query GIS Service to fill out array
      i. Send
         1. Range
         2. Azimuth
      ii. Receive
         1. Elevation Angle
         2. Obstructed
   e. If Sector = Long Range (2200 m to 6000 m)
      i. Start Angle = Elevation Angle of block located at 2200 m with the lowest elevation angle + 26 mils
      ii. Stop Angle = Elevation Angle of block located at 6000 m with the highest elevation angle − 26 mils
   f. If Sector = Short Range (100 m to 2500 m)
      i. Start Angle = Elevation Angle of block located at 100 m with the lowest elevation angle + 26 mils
      ii. Stop Angle = Elevation Angle of block located at 2500 m with the highest elevation angle − 26 mils
   g. Adjust Start Angle and Stop Angle to closest multiple of 6
   h. Number of Steps = (Start Angle − Stop Angle)/6
   i. Create an S × 2 array, where S is the number of steps, using the attributes:
      i. Elevation Angle
      ii. Number of non-obstructed blocks
   j. Optimal Elevation Angle(i) = Max (Number of non-obstructed blocks)
   k. Clutter Map(Visible Blocks) = Visible
6. Output
   a. Send output to Radar Configuration Software
      i. Clutter Map
      ii. Clutter Map Reference
      iii. Number of Sectors
      iv. Start Azimuth for each Sector
      v. Stop Azimuth for each Sector
      vi. Start Range for each Sector
      vii. Stop Range for each Sector
      viii. Elevation Angle for each Sector Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A computer implemented method of configuring a land-based radar system for scanning a scan region, the method comprising:
   (a) dividing the scan region into a grid of blocks;
   (b) obtaining a terrain elevation data for the scan region;
   (c) for a scan elevation angle for the radar system, determining those blocks in the grid that are visible to the radar system and those blocks that are not visible to the radar based on the terrain elevation data;
   (d) repeating the step (c) for all scan elevation angles in a predefined set of elevation angles;
   (e) determining an optimal scan elevation angle for the radar system as the scan elevation angle which resulted in the maximum number of visible blocks in the scan region; and
   (f) setting the radar system to the optimal scan elevation angle.

2. The method of claim 1, further comprising generating a clutter map of the scan region by distinguishing the visible blocks in the grid from those that are not visible for the optimal scan elevation angle.

3. The method of claim 2, further comprising presenting the clutter map to a radar operator by overlaying the clutter map on the radar system's display.

4. A computer implemented method of configuring a land-based radar system for scanning a scan region, the method comprising:
   (a) dividing the scan region into one or more sectors, each sector comprising a grid of blocks;
   (b) obtaining a terrain elevation data for the scan region;
   (c) for a scan elevation angle for the radar system, determining those blocks in the grid that are visible to the radar system and those blocks that are not visible to the radar based on the terrain elevation data;
   (d) repeating the step (c) for all scan elevation angles in a predefined set of scan elevation angles;
   (e) determining an optimal scan elevation angle for the radar system for each sector as the elevation angle which resulted in the maximum number of visible blocks in that sector; and
   (f) configuring the radar system to use the optimal elevation angle corresponding to each sector.

5. The method of claim 4, further comprising generating a clutter map of the scan region by distinguishing the visible blocks in the grid from those that are not visible in each sector for the optimal scan elevation angle.

6. The method of claim 5, further comprising presenting the clutter map to a radar operator by overlaying the clutter map on the radar system's display.

* * * * *

UNITED STATES PATENT AND TRADEMARK OFFICE
CERTIFICATE OF CORRECTION

| | | |
|---|---|---|
| PATENT NO. | : 7,880,668 B1 | Page 1 of 1 |
| APPLICATION NO. | : 12/330238 | |
| DATED | : February 1, 2011 | |
| INVENTOR(S) | : Stefan M. Krause et al. | |

It is certified that error appears in the above-identified patent and that said Letters Patent is hereby corrected as shown below:

On the Title page, under the Assignee, please replace --Corproation-- to Corporation.

Signed and Sealed this
Twenty-ninth Day of March, 2011

David J. Kappos
*Director of the United States Patent and Trademark Office*